United States Patent [19]

Collins, Jr.

[11] Patent Number: 5,004,916
[45] Date of Patent: Apr. 2, 1991

[54] SCANNING SYSTEM HAVING AUTOMATIC LASER SHUTDOWN UPON DETECTION OF DEFECTIVE SCANNING ELEMENT MOTION

[75] Inventor: Donald A. Collins, Jr., Ithaca, N.Y.

[73] Assignee: NCR Corporation, Dayton, Ohio

[21] Appl. No.: 387,551

[22] Filed: Jul. 28, 1989

[51] Int. Cl.⁵ ............................................. H01J 3/14
[52] U.S. Cl. .................................. 250/235; 235/472; 219/121.62
[58] Field of Search ............... 250/235, 236; 235/470, 235/472, 462; 219/121.61, 121.62; 372/27

[56] References Cited

U.S. PATENT DOCUMENTS

| | | | |
|---|---|---|---|
| 3,735,142 | 5/1973 | Harr et al. | 250/219 D |
| 4,349,814 | 9/1982 | Akehurst | 340/679 |
| 4,403,177 | 9/1983 | Weber et al. | 318/254 |
| 4,460,120 | 7/1984 | Shepard et al. | 235/472 |
| 4,510,422 | 4/1985 | Ogura | 318/254 |
| 4,575,625 | 3/1986 | Knowles | 235/467 |
| 4,675,585 | 6/1987 | Krueger et al. | 318/358 |
| 4,678,288 | 7/1987 | Lonsdale et al. | 350/432 |
| 4,680,515 | 7/1987 | Crook | 318/318 |
| 4,694,182 | 9/1987 | Howard | 250/566 |
| 4,700,116 | 10/1987 | Inoue et al. | 318/254 |
| 4,717,864 | 1/1988 | Fultz | 318/254 |
| 4,751,438 | 6/1988 | Markunas | 318/254 |
| 4,758,768 | 7/1988 | Hendricks et al. | 318/254 |

Primary Examiner—David C. Nelms
Assistant Examiner—Stephone B. Allen
Attorney, Agent, or Firm—Wilbert Hawk, Jr.; Stephen F. Jewett; Gregory P. Gadson

[57] ABSTRACT

A scanning system having a motor-driven scanning element automatically shuts down a scanning laser when the motor is either inoperative or operating below a safe speed. A microprocessor already used to drive the scanning circuitry is also used to control the operation of the motor, including commutation logic, and also controls the automatic laser shut-down. This results in a significant reduction of power requirement.

18 Claims, 6 Drawing Sheets

SCANNING SYSTEM HAVING AUTOMATIC LASER SHUTDOWN UPON DETECTION OF DEFECTIVE SCANNING ELEMENT MOTION

BACKGROUND OF THE INVENTION

The present invention generally relates to scanning systems capable of reading bar codes. More particularly, the present invention provides a safety feature for disabling a scanning illuminator when the movement of the scanning mirror is inadequate (too slow or absent).

Some scanning systems of the laser (light amplification by stimulated emission of radiation) type focus a laser beam upon a motor-driven, rotating or dithering scanning mirror such that the laser beam forms a scanning pattern across a target bar code. The scanning laser beam is back-reflected to a photodetector, which determines the intensity of the back-reflected laser beam and outputs a current in proportion thereto. Thus a varying signal is output by the photodetector as the laser beam sweeps across a pattern of light and dark "bars" in a bar code.

Control circuitry controls the cooperation and coordination of the components (including the timing) and converts the photodetector output signal into useful form. Scanning speed is chiefly controlled by the speed of the motor.

The preferred embodiment of the present invention has a three-phase, direct current (DC) motor of the brushless type. Rather than using a commutator (for appropriately reversing the magnetic fields to "pull" the armature around its axis), varying signals (commutation logic) are applied to the appropriate windings to cause the magnetic fields to constantly change. The commutation logic is microprocessor controlled.

A three-phase motor is used instead of a single-phase motor since it provides for constant instantaneous power, and therefore a constant speed—an important feature for scanning operations.

An important safety consideration is to be able to shut down the laser if the the motor and thus scanning mirror cease operating, or operate below a certain speed. The result of motor malfunctioning is unnecessarily prolonged laser beam projection on the scanning surface, upon pattern mirrors in the scanner, and out of the scanner into free space.

SUMMARY OF THE INVENTION

It is an object of the present invention to provide a laser scanning system having an automatic laser shut-down safety feature when scanning element motion is below a threshold.

It is another object of the present invention to implement such an automatic shut-down feature using existing motor drive and control circuitry to monitor scanning element movement.

It is yet another object of the present invention to share the same microprocessor for scanning circuitry control and symbol decode, motor control (including commutation logic for a brushless motor), and automatic laser shut-down, resulting in a simple, reduced power system.

An additional object of the present invention is to utilize Hall sensors present in a brushless drive motor to determine when to activate and deactivate the laser operation.

A further object of the present invention is the capability of implementing the above objects in portable hand-held units, as well as stationary slot scanners and other types of bar code scanning equipment.

There is provided in accordance with the present invention, a method of laser shutdown in a laser scanning system capable of reading the likes of a bar code including the steps of moving a scanning element by a motor connected to the scanning element, producing a laser beam for focus upon and deflection by the scanning element, the laser beam thus being able to scan the likes of a bar code, driving the motor, and outputting signals from sensors connected to the motor corresponding to scanning element movement, and receiving signals from the sensors and automatically shutting down the operation of the laser when the amount of movement of the scanning element is below a threshold.

The above and other objects, features, and advantages of the present invention will become apparent from the following description with reference to the attached drawings.

DETAILED DESCRIPTION OF THE INVENTION

Figure 1:
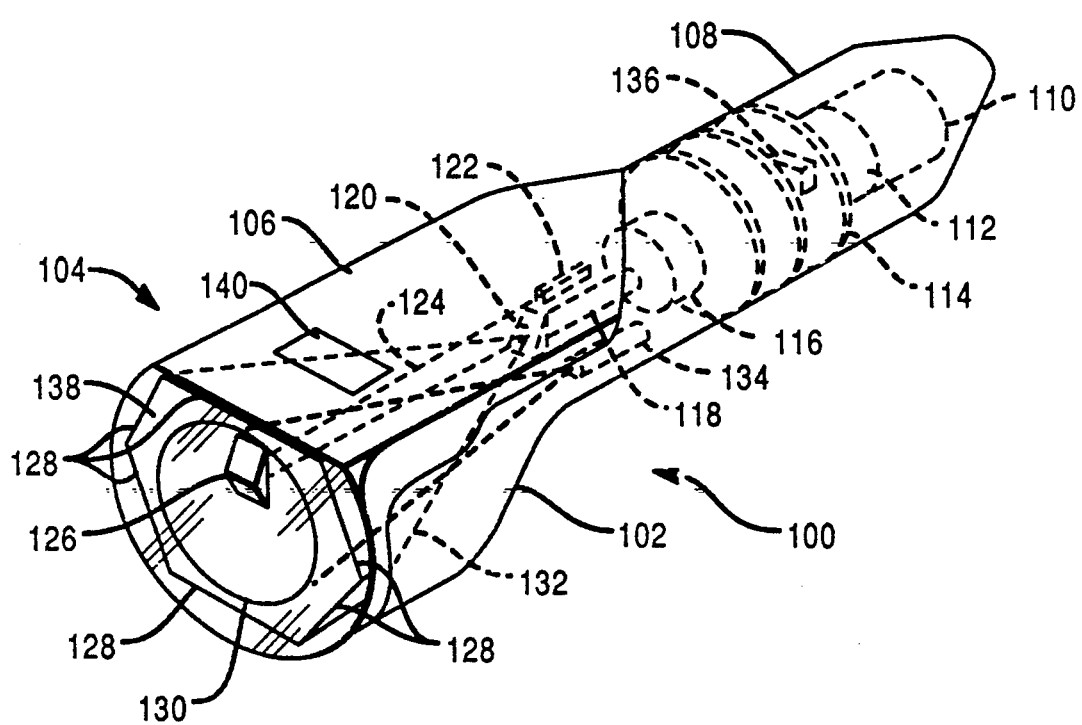
FIG. 1 is a perspective view, with certain internal, hidden details shown in phantom, of a hand-held laser scanner capable of incorporating the present invention.
Figure 2:
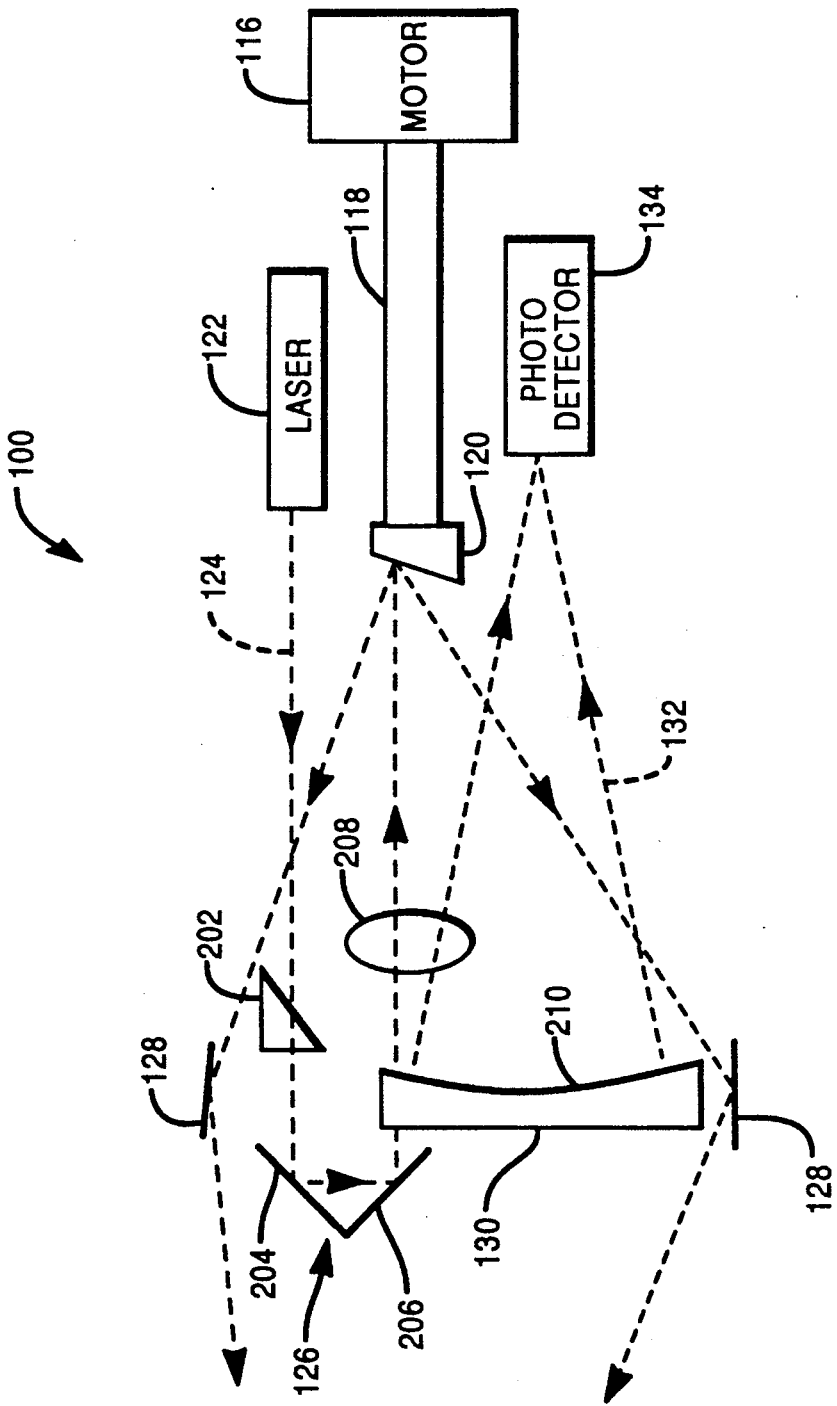
FIG. 2 is a schematic diagram of the scanner in FIG. 1.

Referring now to FIGS. 1 and 2, a hand-held laser scanner 100 having a casing 102 and a front portion 104 is shown. The front, upper portion 106 of the casing 102 is a flat surface in the present embodiment, while the rear portion 108 of the casing 102 is in the form of a handle.

A power supply 110 (which may be of the battery or line power variety) supplies power to the components of the scanner 100. A radio transmitter 112 transmits radio signals to a receiver in a remote processing unit (not shown) indicative of a scanned bar code (not shown). The handle 108 also includes electrical rack members 114, and a motor 116 connected to a rotatable shaft 118, which motor and shaft rotate a scanning element 120 attached to the shaft 118 for altering the path of a laser beam. The scanning element is a mirror in the preferred embodiment.

A laser or laser diode member 122 emits a laser beam 124 which is back-reflected by a pair turning mirrors 126 which are arranged at an angle of 90° relative to each other. The rotating scanning element 120 reflects the laser beam received from the turning mirrors 126 toward six turning mirrors 128 located at the front portion 104 of the scanner 100. The turning mirrors 128 direct light derived from the laser 122 toward a bar code label (not shown) on a product to be scanned, for example.

A collection lens 130 collects and focuses light reflected from the bar code label along paths 132 upon a photodetector 134. The photodetector 134 converts the received light into electrical signals indicative of the light intensity. The turning mirrors 126 are mounted on the collection lens 130, which is in turn mounted on a glass plate member 138. A processing member 136 mounted on one of the electrical rack members 114 receives and converts the electrical signals output by the photodetector 134 into data used to address a look-up table in the remote processing unit. The data output by the processing member 136 is transmitted to the remote processing unit by the radio transmitter 112.

A user interface portion 140 contains a light-emitting-diode (LED) display and a speaker for audio-visually indicating to the user whether a current scan operation has been successful.

The scanning operation will now be examined more closely with reference to FIG. 2. The drive shaft 118 rotates the scanning element 120 via the motor 116. Light from the laser 122 along path 124 is circularized by an anamorphic prism 202, and then back-reflected by the pair of turning mirrors 126 composed of mirrors 204 and 206. The light reflected from the turning mirrors 126 is focused by a lens 208 onto the surface of the scanning element 120. The rotation of the scanning element 120 causes light to be reflected toward the turning mirrors 128. The light reflected from the turning mirrors 128 falls upon the target bar code label in the form of scan lines, as is well known in the art.

The light reflected from the bar code label is collected and transmitted to the photodetector 134 by the collection lens 130 which has a concave surface 210. A more detailed description of the above-mentioned features of the hand-held laser scanner of the present invention can be found in U.S. Pat. Application Ser. No. 284,643, filed on Dec. 15, 1988 and assigned to the assignee of the present application, which Application Ser. No. 284,643 is hereby expressly incorporated by reference.

Figure 3:
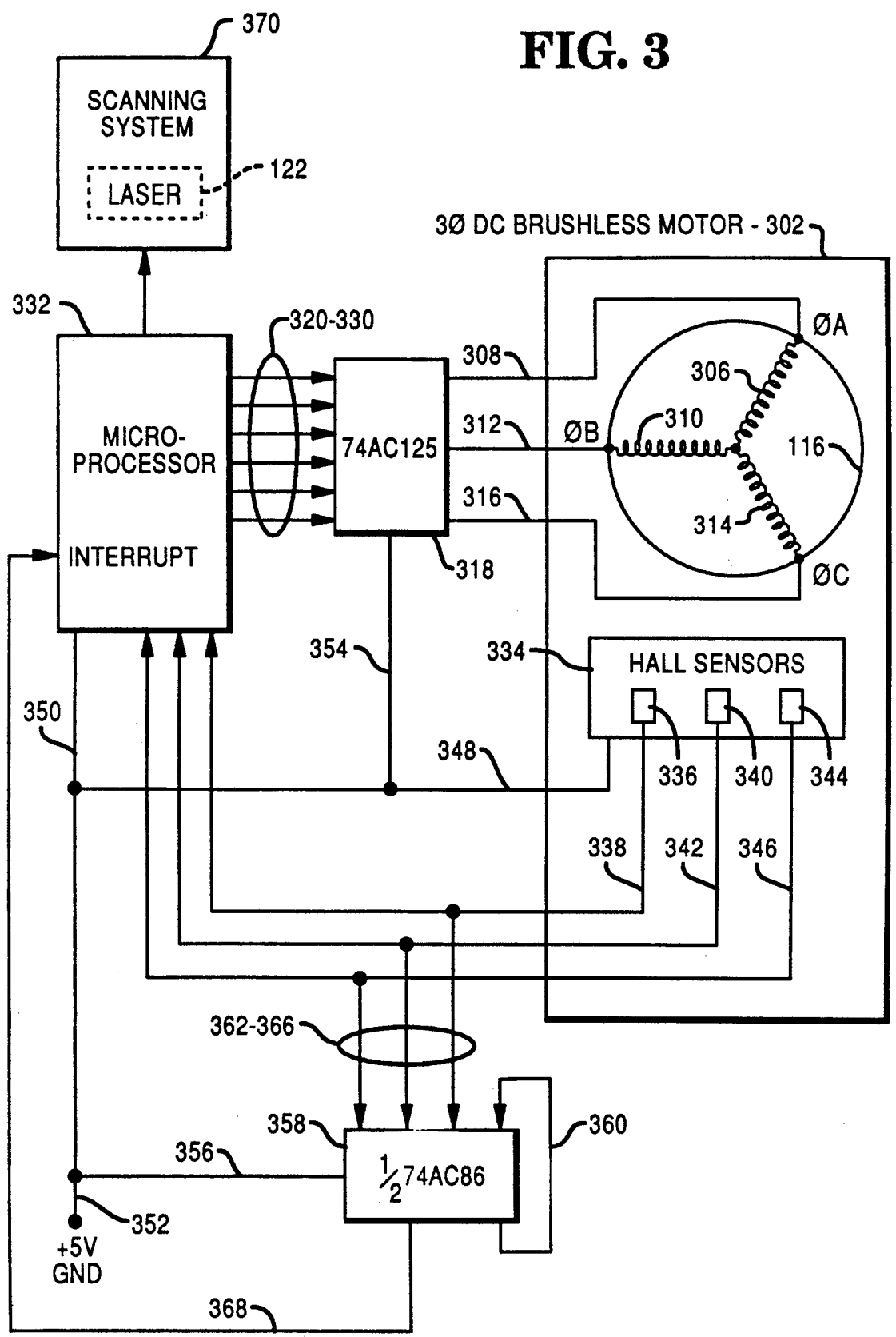
FIG. 3 is a schematic diagram of the control circuitry for the scanner motor and laser.

Turning to FIG. 3, control for the commutation logic and laser operation interrupt is shown. A motor and sensor unit 302 contains the three-phase, brushless DC motor 116 which has three sets of equispaced armature coils 306, 310 and 314 each connected to a lead line 308, 312 and 316, respectively. The lead lines 308, 312 and 316 are connected to a bus driver chip 318, which supplies the necessary voltages to the sets of armature coils 306, 310 and 314 for rotation of a four-pole rotor (not shown) at a constant speed.

The bus driver 318 is connected by a group of control leads 320–330 to a microprocessor 332, which supplies the commutation logic necessary for motor operation. A Hall sensing unit 334 contains three Hall sensors 336, 340 and 344 spaced 60° apart from each other (i.e. Hall sensor 340 is spaced 60° from the sensor 336, and Hall sensor 344 is spaced 60° from Hall sensor 340), each connected to a lead 338, 342 and 346, respectively. A 5 volt power source 352 supplies power via line 348 to the Hall sensing unit, and power to the other units via lines 350, 354 and 356 as shown. The Hall sensors detect movement of the rotor in a conventional and well-known manner and sen! signals evidencing the same to the microprocessor 332 and Exclusive Or (XOR) gate 358 (having one of its inputs tied to an output via line 360) via leads 362–366. The XOR gate 358 outputs an interrupt signal to the microprocessor 332 via line 368 when any of the Hall sensors sees a change in rotor position as will be apparent to those skilled in the art. Given the configuration of the rotor, and the position of the Hall sensors, the rotor movement is thus monitored every 30° of rotation.

The microprocessor 332 also controls the operation of the scanning system 370 which includes the laser 122 (as detailed in the descriptions of FIGS. 1 and 2, infra). When the interrupt signal is received by the microprocessor 332, it determines by examining the signals on lines 338, 342 and 346 whether there has been rotor movement. If not, the microprocessor 332 sends a disable signal to the laser 122 to avoid unacceptable laser intensity. If movement is detected, the rotor speed is calculated, and the process begins anew by supplying commutation logic to the bus driver 318. The system can also be made to send a disable signal to the laser 122 if the speed of the rotor falls below a threshold.

Figure 4:
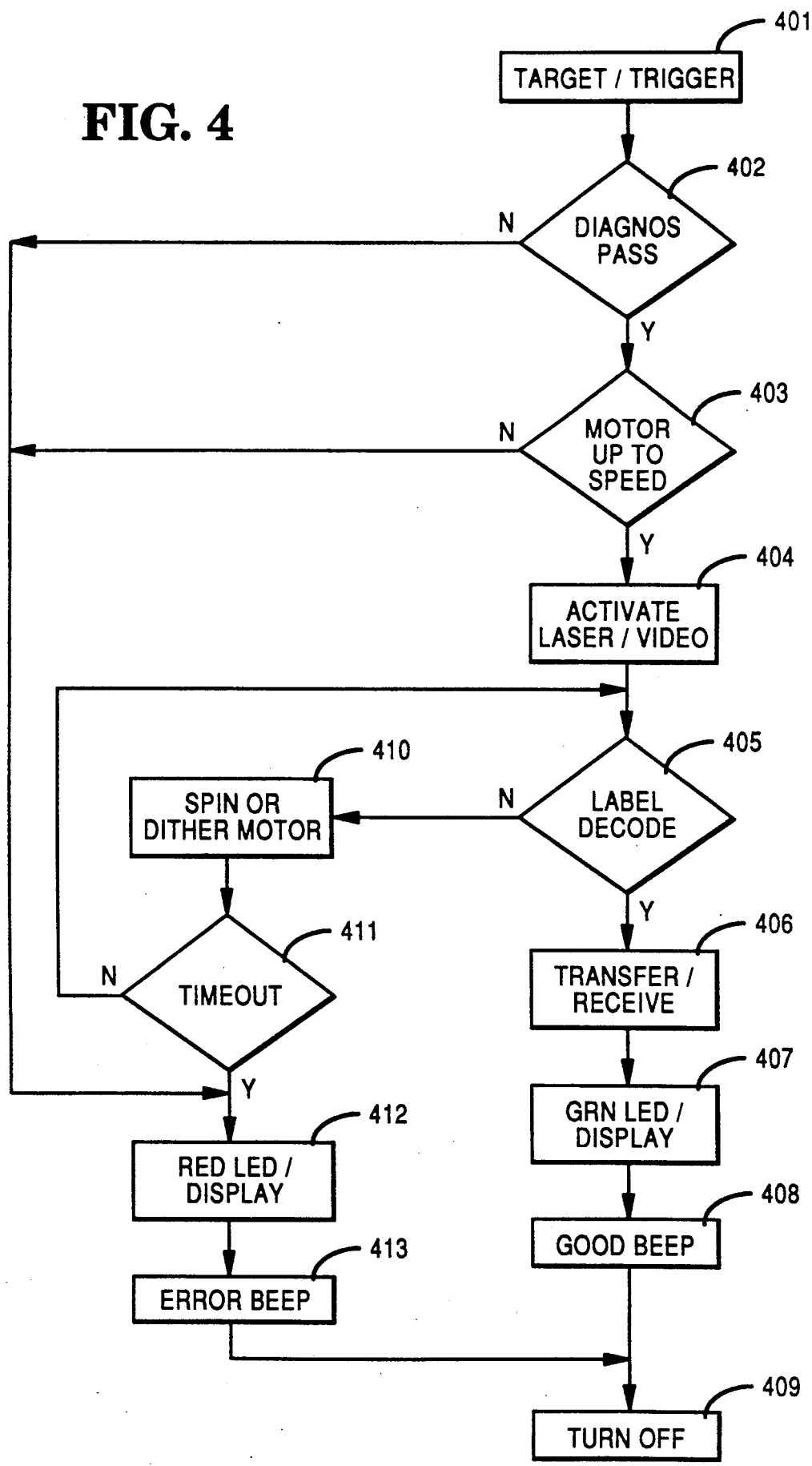
FIG. 4 is a flow chart diagramming the motor control and automatic laser shut-down operation sequence.

The flow chart in FIG. 4 generally illustrates the operation of the scanner 100, particularly the motor and laser control, and laser interrupt operations. The operation of the scanner 100 is under the control of a program executed by the microprocessor 332. As can be seen, the system is turned on (step 401) and a conventional diagnostic subroutine is executed to make a preliminary determination as to whether the microprocessor 332 is functioning properly (step 402). If the diagnostic test is passed, the next step is to determine whether the motor speed is adequate (step 403), otherwise an error message is displayed and an error tone (or "beep") is heard (steps 412 and 413), and the system is shutdown (step 409). The details of step 403 will be described below in conjunction with FIG. 5.

Returning to FIG. 4, if the the motor speed is adequate, the laser and a video circuit (in the scanning system 370) for operating the laser beam are activated (step 404) and an attempt is made at reading the target bar code label and providing the signal representing the code to the microprocessor 332 (steps 405 and 406). If the read of the bar code is successful, a green LED is activated (step 407) along with a beep of a certain pitch (step 408). If the label decode attempt is unsuccessful, the system determines if another label decode attempt should be automatically, carried out (steps 410 and 411) by continuing the spin or dither of the motor and trying another decode unless predetermined time period has expired. If not, a red LED is activated (step 412) along with an error beep (step 413) of a certain pitch (distinguished from the beep after a successful "read"), as previously mentioned.

Figure 5:
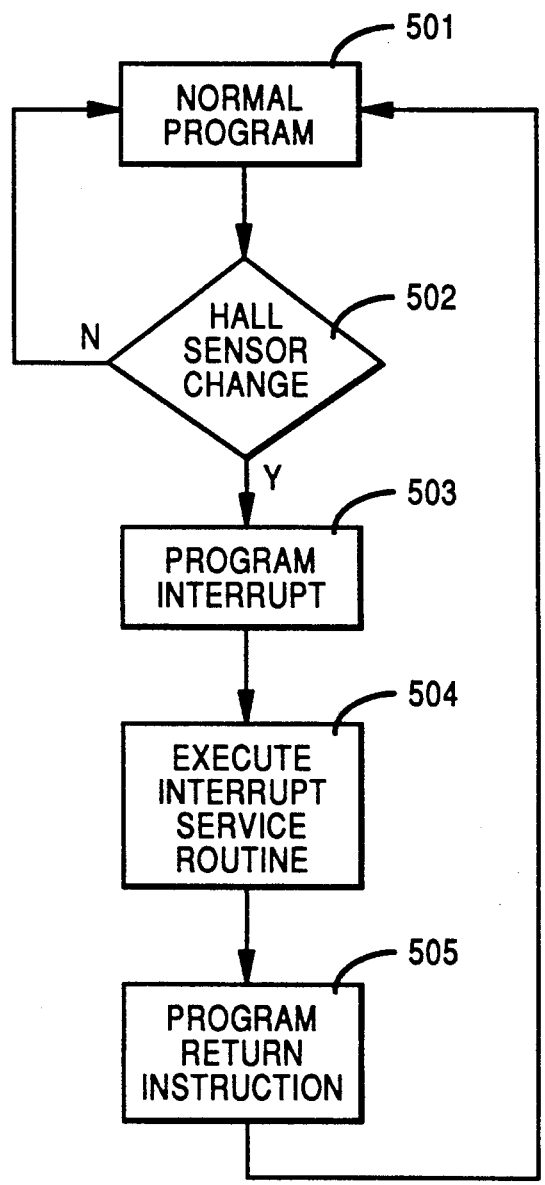
FIG. 5 is a flow chart diagramming entry to the motor interrupt service routine from the main program (operation sequence).
Figure 6:
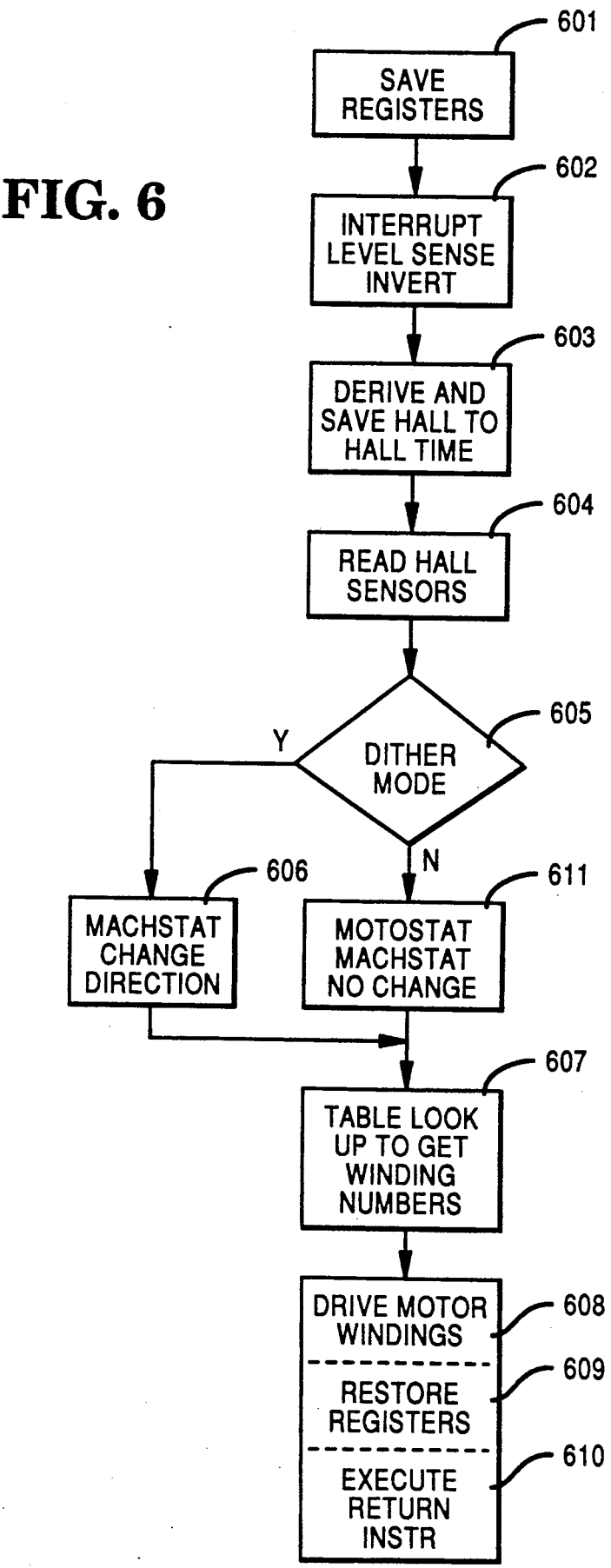
FIG. 6 is a flow chart diagramming the motor interrupt service routine.

FIG. 5 illustrates the steps used to determine whether the motor speed is adequate (with step 501 indicating the execution of the steps in the normal or main program in FIG. 4). First, the microprocessor determines whether there has been a Hall sensor change (step 502). If a Hall sensor change has been detected, the motor is operating at the acceptable speed and the program is interrupted (step 503) to go to the normal motor control routine to maintain the speed (to be described below in connection with FIG. 6). If a Hall sensor change has not been detected, the previously mentioned error signals are produced and displayed, and the laser/system is shutdown (the program returns to step 501 via step 505, and therefore executes steps 412, 413 and 409 in FIG. 4). During this determination, an interrupt service routine is executed (step 504), as is shown in FIG. 6.

First, the contents of the accumulator and other registers in the microprocessor 332 are saved (for example, program status words), as evidenced by the block labeled "SAVE REGISTERS" (step 601). In the next step ("INTERRUPT LEVEL SENSE INVERT") the microprocessor is instructed to interrupt the normal sequencing of events on the next edge of the composite signal resulting from XORing the Hall sensor outputs (step 602). In other words, if the previous interruption occurred on a rising edge, then the microprocessor is instructed to interrupt on the next falling edge, and vice versa. The time between interruptions (edge to edge) is measured and stored (the "DERIVE AND SAVE HALL TO HALL TIME" step, or step 603). The Hall sensor outputs are then read in the "READ HALL SENSORS" step (step 604).

A determination is made as to whether the motor is operating in a dither mode or a rotational (or free-spinning) mode (step 605). If the motor is operating in a free-spinning mode the variable MOTOSTAT is read (step 611), which is a number from one to seven representing the current position of the Hall sensors with respect to the rotor. The variable MACHSTAT (for machine status) observed in step 611, indicates in which direction the motor is spinning, for example. In the dithering mode a change in MACHSTAT is observed (step 606).

At this point the motor control system is ready to drive the motor windings to keep the motor operational. First, however, the windings are shut down so that no conflicts occur between the new drives and the previous drives. Then, as conventional, a look up table storing the drives for the windings for the current MOTOSTAT and MACHSTAT values is addressed (step 607). The drives are then supplied to the windings to drive the rotor (step 608). The accumulator and other registers are then restored with the data previously saved during the "SAVE REGISTERS" step (step 609), above. Finally a return instruction is executed to return to the main program (step 610).

Variations and modifications to the present invention are possible given the above disclosure. However, variations and modifications which are obvious to those skilled in the art are intended to be within the scope of this letters patent. For example, the laser scanning system of the present invention is not limited to use in hand-held units. Also, the teachings of the present invention also apply to scanning systems wherein other forms of electromagnetic radiation are substituted for the laser beam.

I claim:

1. A method of laser shutdown in a laser scanning system capable of reading the likes of a bar code comprising the steps of:

moving a scanning element by a motor coupled to said scanning element;

producing a laser beam for focus upon and deflection by said scanning element, said laser beam thus being able to scan the likes of a bar code;

driving said motor, and outputting signals from sensors coupled to said motor corresponding to scanning element movement; and receiving signals from said sensors and automatically shutting down the operation of said laser when the amount of movement of said scanning element is below a threshold.

2. The laser shutdown method in claim 1 further comprising the step of controlling said laser beam production, motor drive, and automatic shutdown of the laser beam with a microprocessor.

3. The laser shutdown method in claim 1 wherein said laser scanning system is of the hand-held type.

4. The laser shutdown method in claim 1 wherein said scanning element is moved in a rotating manner.

5. The laser shutdown method in claim 1 wherein said scanning element is moved in a dithering manner.

6. The laser shutdown method in claim 1 wherein said scanning element is moved in either a rotating or dithering manner.

7. The laser shutdown method in claim 1 further comprising the step of checking scanning element movement with said sensors every 60°.

8. The laser shutdown method in claim 1 wherein said sensors are of the Hall type.

9. The laser scanning system in claim 1 wherein said motor is of the brushless, three-phase, DC type.

10. A laser scanning system capable of reading the likes of a bar code comprising:

a motor;

a movable scanning element coupled to said motor;

a laser for producing a laser beam for focus upon and deflection by said scanning element, said laser beam thus being able to scan the likes of a bar code;

motor drive circuitry for driving said motor, including sensors for outputting signals corresponding to scanning element movement; and means receiving signals from said motor drive circuitry for automatically shutting down the operation of said laser when the amount of movement of said scanning element is below a threshold.

11. The laser scanning system in claim 10 further comprising a microprocessor for controlling said laser, motor drive circuitry, and said means for automatically shutting down the operation of the laser.

12. The laser scanning system in claim 10 wherein said laser scanning system is of the hand-held type.

13. The laser scanning system in claim 10 wherein said scanning element is moved in a rotating manner.

14. The laser scanning system in claim 10 wherein said scanning element is moved in a dithering manner.

15. The laser scanning system in claim 10 wherein said scanning element is moved in either a rotating or dithering manner.

16. The laser scanning system in claim 10 wherein said sensors check said scanning element movement every 60°.

17. The laser scanning system in claim 10 wherein said sensors are of the Hall type.

18. The laser scanning system in claim 10 wherein said motor is of the brushless, three-phase, DC type.

* * * * *